United States Patent [19]
Onno

[11] Patent Number: 5,170,272
[45] Date of Patent: Dec. 8, 1992

[54] SUBSCRIBER TERMINAL INSTALLATION FOR AN ASYNCHRONOUS NETWORK

[75] Inventor: Guy Onno, St Quay Perros, France

[73] Assignee: Alcatel Cit, Paris, France

[21] Appl. No.: 667,143

[22] Filed: Mar. 11, 1991

[30] Foreign Application Priority Data

Mar. 12, 1990 [FR] France ................. 90 03113

[51] Int. Cl.⁵ ............... H04B 10/20; H04B 10/00
[52] U.S. Cl. ............................ 359/118; 359/154; 359/167; 370/91
[58] Field of Search ............... 359/113, 118, 120, 121, 359/128, 139, 154, 167, 1; 370/91, 92, 94.1, 94.2, 60, 60.1, 110.1

[56] References Cited

U.S. PATENT DOCUMENTS

| | | | |
|---|---|---|---|
| 4,451,916 | 4/1984 | Casper et al. | 359/118 |
| 4,825,113 | 8/1989 | Sato et al. | 359/114 |
| 4,967,405 | 10/1990 | Upp et al. | 359/135 |
| 5,050,164 | 9/1991 | Chao et al. | 359/135 |
| 5,062,104 | 10/1991 | Lubarsky et al. | 370/94.1 |
| 5,067,123 | 11/1991 | Hydo et al. | 370/60 |

FOREIGN PATENT DOCUMENTS 0355797 2/1990 European Pat. Off. .
3436722 4/1986 Fed. Rep. of Germany .

OTHER PUBLICATIONS

Global Telecommunications Conference 1987, Session 37, Paper 7, vol. 3, Nov. 15, 1987, Tokyo, Japan, pp. 1-4; A. Brosio et al.: "A modular approach to broadband ISDN over optical fibres".

Primary Examiner—Edward L. Coles, Sr.
Assistant Examiner—Rafael Bacares
Attorney, Agent, or Firm—Sughrue, Mion, Zinn, Macpeak & Seas

[57] ABSTRACT

A subscriber terminal installation for an asynchronous network, the installation having a subscriber digital termination comprising a switching matrix and access modules each connected firstly to the switching matrix and secondly to an asynchronous optical interface. One of the access modules is connected to a network digital termination, while each of the other access modules is connected either to a terminal or else to a terminal adapter. A processor connected to the module processes signalling received or to be transmitted via the access modules. A terminal adapter comprises a multiplex adapter, a service adapter specific to a particular service, and a control circuit. The multiplex adapter is connected via a two-way asynchronous optical interface to an access module and via an up interface and a down interface to the service adapter, the up and down interfaces being asynchronous interfaces conveying cells.

6 Claims, 5 Drawing Sheets

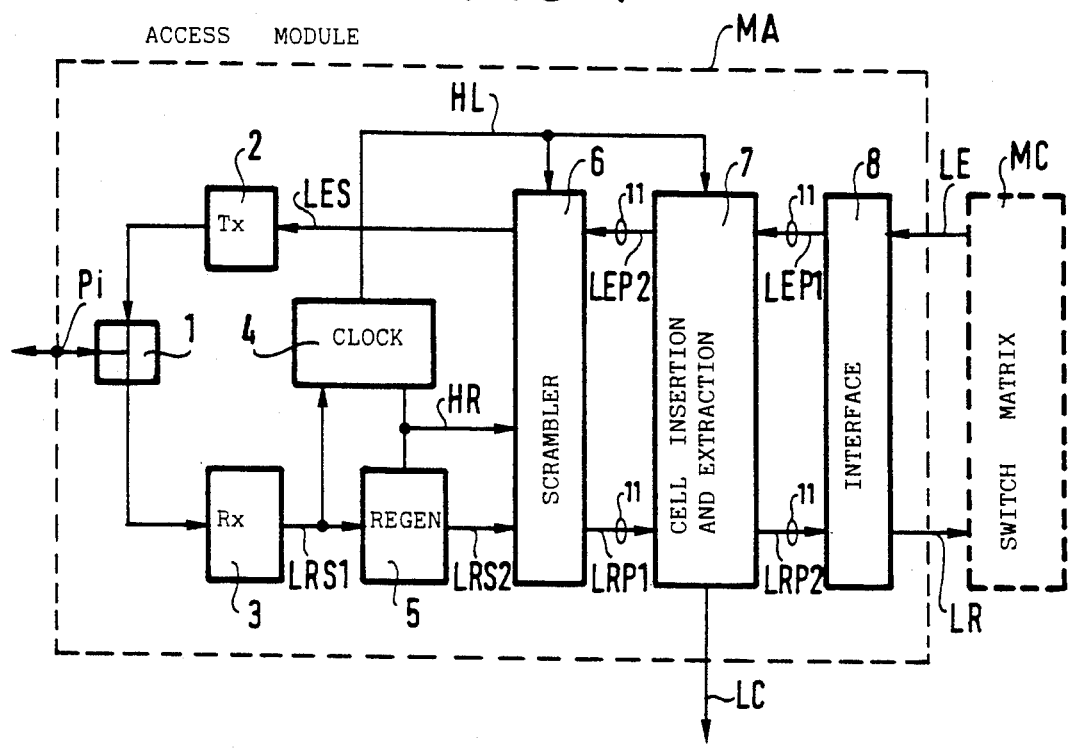
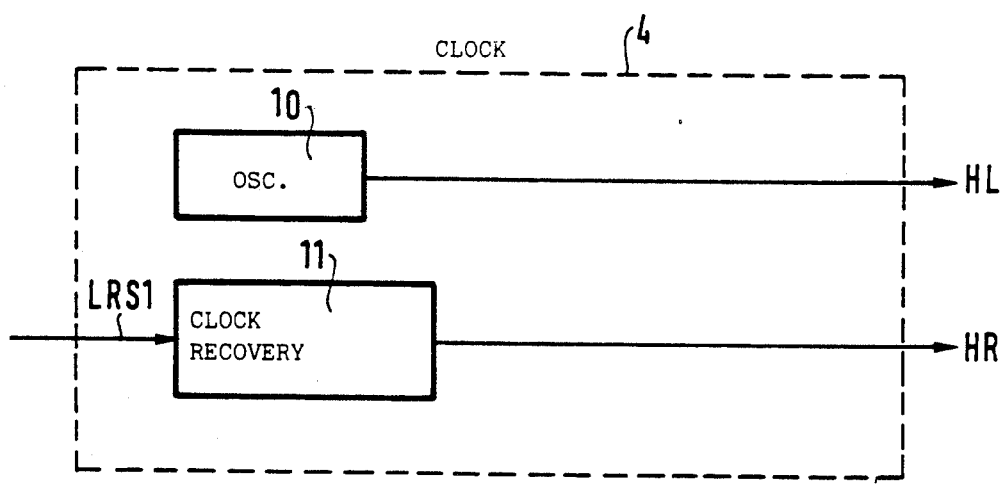

SUBSCRIBER TERMINAL INSTALLATION FOR AN ASYNCHRONOUS NETWORK

The invention relates to a subscriber terminal installation. In general, a subscriber terminal installation serves to interconnect a user's terminals and to connect these terminals to a public network.

BACKGROUND OF THE INVENTION

In the past, subscriber terminal installations have usually been constructed on the basis of a synchronous mode of transfer in which the information to be interchanged occupies a channel having a data rate which is fixed, e.g. 64 kbit/s. Synchronous transfer mode is used in narrowband integrated services digital networks, N-ISDN.

Asynchronous transfer mode, ATM is expected to be used for implementing broadband integrated services networks BISDN which, in addition to providing continuity with N-ISDN services, opens the way to new services requiring data rates at multiple higher values. Asynchronous transfer mode has the particularity of being able to convey information at any data rate providing it remains below the maximum data rate of the transmission path used.

In asynchronous transfer mode, information is transported in the form of cells of fixed length. These cells comprise a header of fixed length and an information field which is also of fixed length. Information belonging to a particular call is identified from a virtual circuit number contained in the header of the cell. This mode of multiplexing information makes it possible to convey information at arbitrary rates without requiring any transmission frame structure other than the cell structure. It is assumed below, purely by way of example, that header length is four 8-bit bytes and that information field length is 32 bytes, giving a total cell length of 36 bytes. Naturally, the header and the information field could have lengths other than those mentioned above.

An object of the invention is to provide a subscriber installation based on asynchronous transfer mode and capable of providing both continuity for the services offered by synchronous terminals connected to an existing installation and also opening the way to new services at data rates that are not yet fully identified.

Another object of the invention is to provide a subscriber terminal installation that is capable of evolving to adapt to the needs of the user.

SUMMARY OF THE INVENTION

The present invention provides a subscriber terminal installation for an asynchronous network in which information is organized in cells, the installation comprising:

a first digital terminal network connected to the asynchronous network;

a second digital network terminal connected via a two-way asynchronous optical interface to the first digital terminal network;

terminals connected directly to said second network terminal;

and terminals connected to said second digital network terminal via terminal adapters;

wherein the second digital network terminal comprises:

a switching matrix;

a plurality of access modules having the same structure but possibly operating at different clock frequencies; all of the access modules being connected to the switching matrix; one of the access modules being further connected to the first digital network terminal via the two-way asynchronous optical interface, and each of the other access modules being further connected via a two-way asynchronous optical interface to one of the following: a terminal and a terminal adapter; and at least one processor connected to the access modules.

FIG. 1 shows the CCITT recommended configuration for subscriber installations and interfaces between the subassemblies of installations. In this figure:

T is a terminal;
TA is a terminal adapter;
NT2 is a network terminal 2;
NT1 is a network terminal; and
R, S, T, U are interfaces.

The present invention relates to the second digital network terminal NT2 and to means for connecting said termination to the terminals and to the network digital termination NT1.

BRIEF DESCRIPTION OF THE DRAWINGS

An embodiment of the invention is described by way of example with reference to the accompanying drawings, in which:

FIG. 4 shows an access module of the broadband digital network terminal of FIG. 2;

FIG. 5 shows a clock module for the access module;

DETAILED DESCRIPTION OF THE INVENTION

Figure 2:
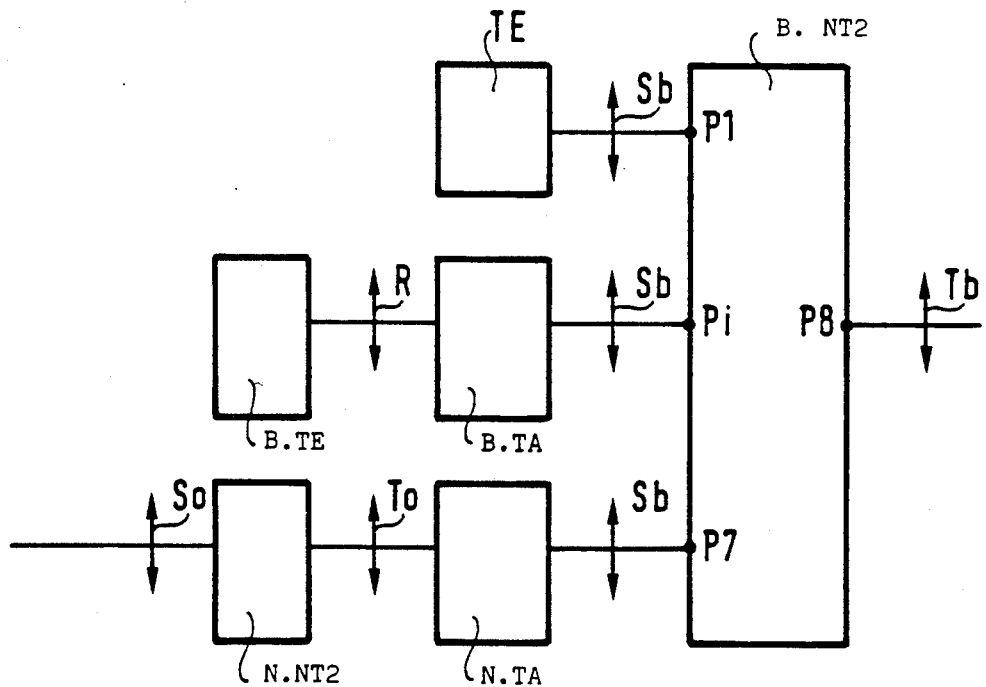
FIG. 2 shows the general architecture of a subscriber terminal installation implementing a broadband digital network terminal and connection means of the invention.

FIG. 2 shows the general architecture of a subscriber terminal installation including a broadband digital network terminal B.NT2 and its connection means of the invention. These connection means are asynchronous optical interfaces Tb and Sb and terminal adapters B.TA and N.TA.

Figure 1:
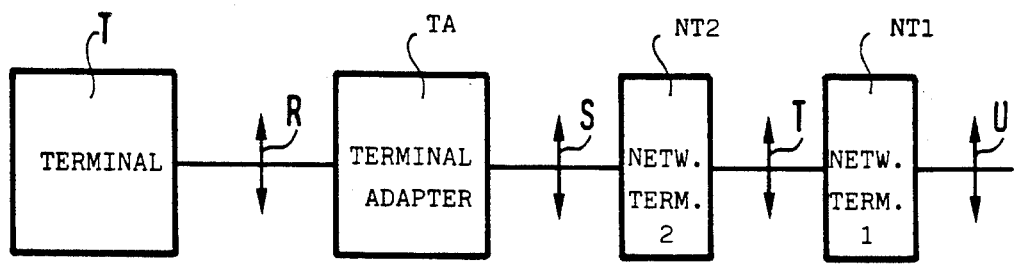
FIG. 1 is a block diagram of a subscriber terminal installation and the association interfaces, as described.

The optical interface Tb conveys data at a rate of up to 600 Mbit/s, as in FIG. 1 this interface Tb connects a port P8 of the terminal B.NT2 to the digital network terminal NT.1.

The broadband digital network termination B.NT2 performs a switching function in order to provide local calls between terminals connected to the ports P1 to P7 of said terminal via interfaces Sb, with there being seven such interfaces in this example. Naturally there could be a different number of interfaces Sb.

The optical interfaces Sb convey data at rates of up to 600 Mbit/s.

Broadband terminals TE in asynchronous transfer mode (only one of which is shown) are connected directly via an interface Sb to one of the ports of the termination B.NT2.

Broadband terminals B.TE having interfaces R that are not compatible with asynchronous transfer mode (only one terminal B.TE is shown) are each connected via a broadband adapter B.TA and an interface Sb to a port of the termination B.NT2.

Narrowband terminals are assumed to be connected via an interface So to a previously existing narrowband terminal N.NT2 having an interface To (or T2). This narrowband terminal N.NT2 is connected via a narrowband adapter N.TA and an optical interface Sb to one of the ports of the termination B.NT2.

One of the essential characteristics of such a subscriber terminal installation is that the real data rate at the interfaces Sb and Tb can be at multiple data rates depending on the real needs of the installation and without altering other facilities.

Figure 3:
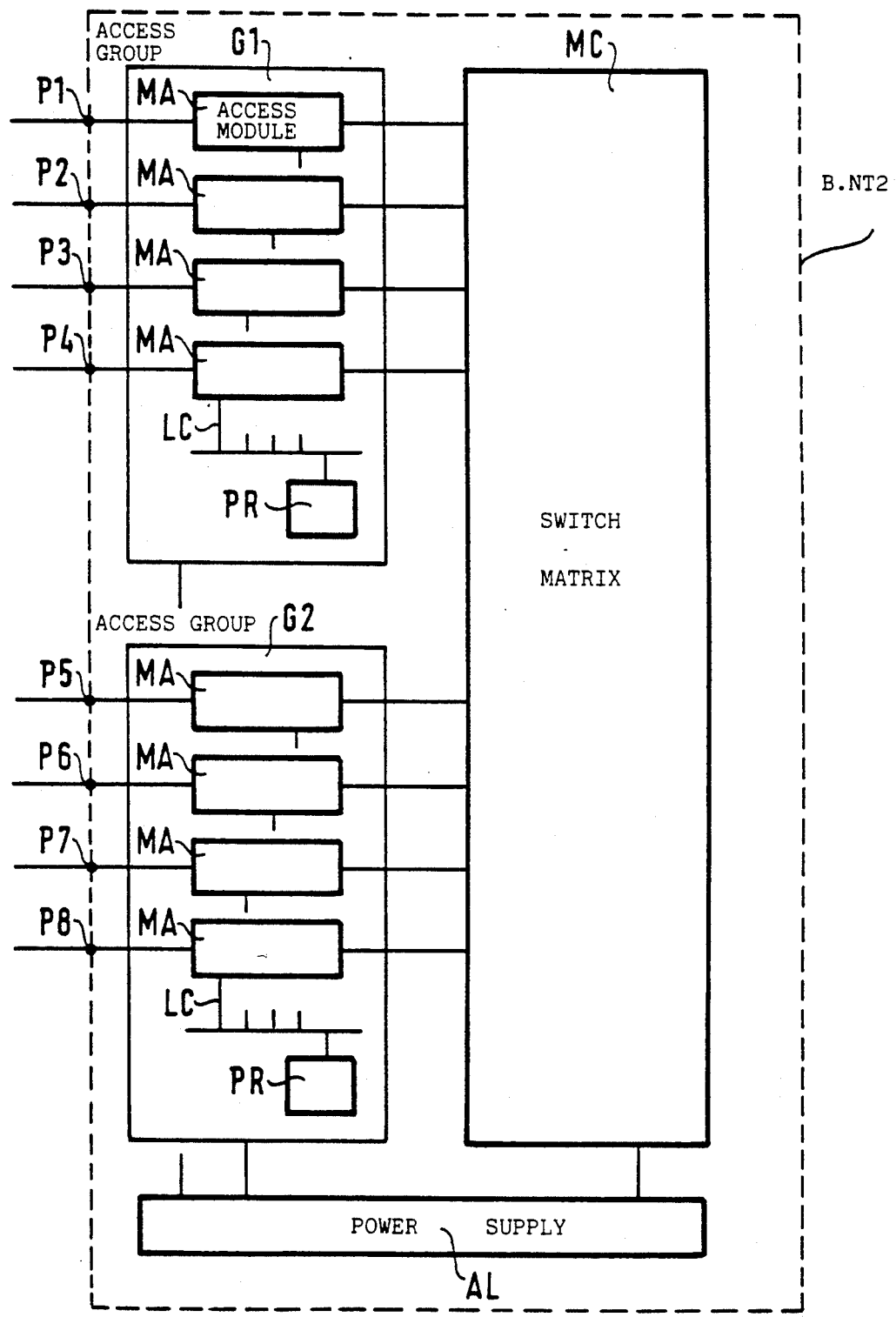
FIG. 3 is an overall block diagram of the broadband digital network termination of FIG. 2.

FIG. 3 is a block diagram of a broadband digital network terminal B.NT2 of FIG. 2.

The terminal B.NT2 comprises a switching matrix MC, two access groups G1 and G2, and a power supply AL. Each access group includes four access modules MA each connected via a control link LC to a processor PR which acts as a local controller. The power supply AL is connected to the switching matrix MC and to the access groups. Ports P1 to P8 of the terminal are each connected to a corresponding access module. The switching matrix MC of conventional type is, in this example, of the type having eight inlets by eight outlets. Each access module MA is thus connected to one inlet and to one outlet of the switching matrix MC.

In each access group, the processor PR performs signalling and supervisory processing fuctions for the four access modules MA in the access group.

Each of the ports P1 to P7 is connected to an optical interface Sb, while the port P8 is connected to optical interface Tb as shown in FIG. 2.

FIG. 4 is a block diagram of an access module MA as contained in the access groups G1 and G2 of FIG. 3.

Port Pi of the access module is connected to an optical interface Sb or Tb. The optical interfaces Sb or Tb use a monomode optical fiber for transmission in both directions, with the wavelengths used being 1300 nm for reception and 1500 nm for transmission. The data rate in each direction is no greater than 600 Mbit/s, with the signal being a multiplex of asynchronous cells, and with the code used being a scrambled NRZ code. No periodical structure appears in the electrical characteristics of the signal transported. In particular:

cell synchronization is provided by recognizing empty cells; and functions related to operating the interfaces Sb and Tb make use of special cells that do not necessarily recur periodically, i.e. the exact number of data cells or of empty cells between two line operation cells is not necessarily constant. This makes it possible to achieve an arbitrary line data rate without altering the other characteristics of the line.

The line data rate at the optical interfaces may be arbitrary, but in order to take account of implementation problems, only a few data rate values are actually used, e.g.: 600 Mbit/s for the interface Tb and the interfaces Sb connected to the highest speed terminals (e.g. high definition images); 150 Mbit/s for covering a wide range of intermediate data rate services; and 10 Mbit/s since this data rate is directly accessible to all technologies and can be used for narrowband services. The access modules MA are thus all of the same structure and they differ solely by the frequency of a local clock signal, which frequency may be 600 MHz, 150 MHz, or 10 MHz.

The port Pi is connected to an optical duplexer 1, itself connected to an optical transmitter 2 and an optical receiver 3. The optical transmitter includes a 1550 nm laser, and the optical receiver includes a PIN diode. A clock module 4 generates a local clock signal HL at the data rate for the transmission direction (600 Mbit/s, 150 Mbit/s, or 10 Mbit/s) and it recovers a clock signal from the data in the receive direction, with the clock module being connected to a serial receive link LRS1 at the output from the optical receiver 3. A regenerator 5 for regenerating the levels and the time intervals of the receive data is connected to the optical receiver by the serial receive link LRS1 and to the clock module 4 which delivers a recovered clock signal HR thereto. A parallel-series circuit 6 for scrambling is connected to the optical transmitter 2 via a serial transmit link LES and to the regenerator 5 via a serial receive link LRS2. It also receives the local clock signal HL and the recovered clock signal HR from the clock module. A cell insert and extract circuit 7 for inserting and extracting signalling cells is connected to the parallel-series scrambler 6 by a parallel transmit link LEP2 and by a parallel receive link LRP1 to deliver data to the parallel-serial circuit 6 in the transmit direction and to receive data therefrom in the receive direction. The cell insert and extract circuit 7 is also connected via a two-way control link LC to the processor PR of the group to which the access module belongs and to the clock module 4 from which it receives the local clock signal HL. An interface circuit 8 is connected to the insert and extract circuit 7 via a parallel transmit link LEP1 and via a parallel receive link LRP2. It is also connected to the switching matrix MC via a transmit line LE and a receive line LR.

The interface circuit 8 transposes between the transmit line LE and the parallel transmit link LEP1, and also between the parallel receive link LRP2 and the receive line LR. Depending on the technology used, the transmit line LE and the receive line LR may either be of the parallel type having four data wires at 150 Mbit/s, a wire for a clock signal at 150 MHz, and a wire for a start-of-cell signal, or else they may be constituted by single wires for a serial stream at 600 Mbit/s with signals being regenerated and with the clock being recovered.

The parallel transmit links LEP1 and LEP2, and the parallel receive links LRP1 and LRP2 have eleven wires each: eight data wires FD11 . . . 8 (one for each bit of a byte), a wire F9 for a clock signal HO at the link rate, a wire F10 for a full-cell signal PC which is at level 0 throughout the duration of a full-cell, and a wire F11 for a start-of-cell signal SDC which is at level 0 at the start of the cell, i.e. for the first byte of a full-cell.

In addition to the PIN diode, the optical receiver 3 includes a preamplifier and an automatic gain control (AGC) amplifier as is well known to the person skilled in the art. The regenerator 5 may also form a portion of the optical receiver.

FIG. 5 shows the clock module 4 of FIG. 4. This module comprises an oscillator 10 and a clock recovery circuit 11. The oscillator delivers the local clock signal HL at a frequency of 600 MHz, or 150 MHz or, 10

MHz. The clock recovery circuit 11 has its input connected to the optical receiver 3 via the serial receive link LRS1, and it delivers the recovered clock signal HR.

Figure 6:
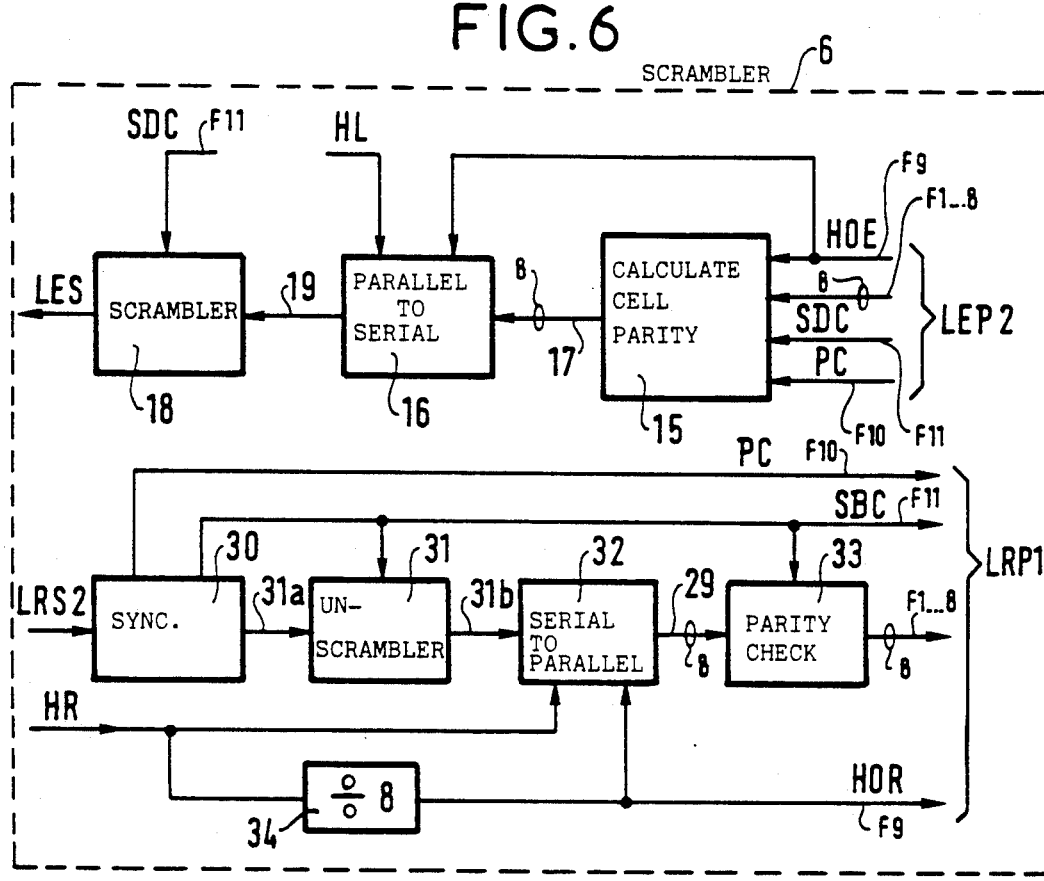
FIG. 6 shows a parallel-series scrambler circuit for an access module.

FIG. 6 shows the parallel-serial scrambler circuit 6 of FIG. 4 which comprises a transmit path and a receive path. The transmit path is constituted by a cell parity calculating circuit 15 having its input connected to the parallel transmit link LEP2, a parallel-serial converter circuit 16 connected by a link 17 to the output from the circuit 15 and receiving the local clock signal HL and a transmit byte signal HOE via the link LEP2, and a scrambler circuit 18 whose input is connected to the output from the circuit 16 via a serial link 19 and whose output is connected to the serial transmit link LES, said scrambler circuit 18 also being connected to the wire F11 of the link LEP2 from which it receives the start-of-cell signal SDC.

The receive path is constituted by a synchronization circuit 30 for searching for and verifying synchronization having its input connected to the serial receive link LRS2, an unscrambler circuit 31 connected via an input link 31a to the synchronization circuit 30, a serial-parallel converter circuit 32 connected via a link 31b to the output from the unscrambler circuit 31, and a parity check circuit 33 connected to the output of the serial-parallel converter 32 via a parallel link 29 and having its output connected to the eight data wires F1 ... 8 of the parallel receive link LRP1. The synchronization circuit 30 is also connected to the full-cell wire F10 and to the start-of-cell wire F11 of the parallel receive link LRP1 to which it delivers a full-cell signal PC and a start-of-cell signal SDC, respectively. The unscrambling circuit 31 is also connected to the start-of-cell wire F11. The serial-parallel converter 32 receives the recovered clock signal HR and a recovered byte clock HOR delivered by a divided by eight circuit 34 from the signal HR. The output from the divider is also connected to wire F9 of link LRP1.

The synchronization circuit 30 may be of any conventional type, and in particular it may be of the type described in published European patent application 0301934 entitled (in translation): A time division switching system for packets of different lengths.

Figure 7:
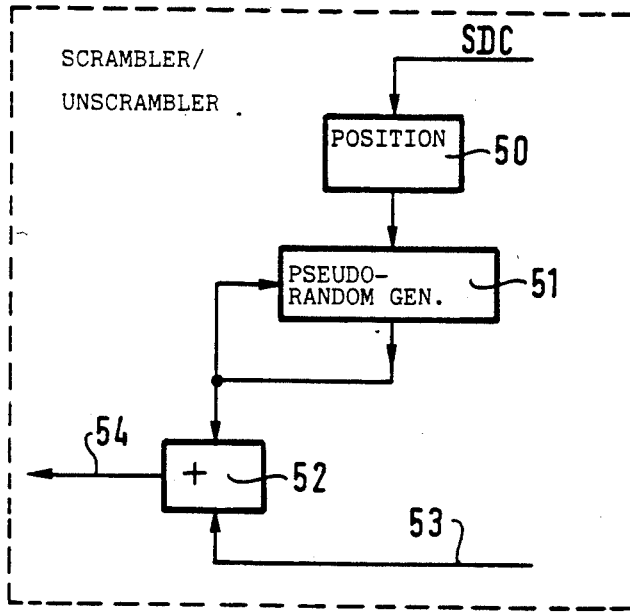
FIG. 7 shows a circuit used as a scrambler and as an unscrambler in the parallel-series scrambler circuit.

Scrambling and unscrambling are performed by a circuit as shown in FIG. 7, comprising a positioning circuit 50, a pseudo-random sequence generator 51, and an adder 52. The generator is synchronized at the start of each cell. To do this, the positioning circuit 52 receives the start-of-cell signal SDC and delivers a positioning signal to the generator which takes up the state 1111111 at the start of each cell. The output of the generator is looped back to its input and is also connected to one of the inputs of the adder 52 whose other input is connected to a link 53 via which it receives data. The output from the adder is connected to a link 54. When the circuit is used as the scrambler circuit 18 of FIG. 6, the links 53 and 54 are respectively the serial link 19 and the serial transmit link LES. When the circuit is used as the unscrambler circuit 31 in FIG. 6, the links 53 and 54 are respectively the links 31a and 31b.

Data is scrambled by adding the data to a pseudo-random sequence delivered by the generator 51 of the circuit 18 as synchronized by the start-of-cell signal SDC. This addition takes place under the following conditions:
the generator is positioned at the start of each cell;
the header of each cell is left unchanged; and
empty cells are not modified.

Unscrambling of data is likewise performed by adding the scrambled data to a pseudo-random sequence delivered by the generator 51 of the circuit 31 as synchronized by the start-of-cell signal SDC. This addition is performed under the same conditions as applied to scrambling.

The parity check circuit 33 of FIG. 6 checks the parity of the number of logic 1 bits in the entire content of a cell (both the header and the information fields). Since even parity is forced on transmission, detecting odd parity means that a transmission error has been detected. The result of the parity check is applied to the cell insert and extract circuit 7 for accounting purposes.

The cell insert and extract circuit 7 performs the following functions:
matching the access rate to the rate of the switching matrix MC;
monitoring the access lines connected to the ports P1 to P8 which are the different accesses to the digital network terminal B.NT2;
inserting and extracting signalling and control cells, thereby enabling access modules MA (FIG. 3) to communicate either with one another or else with equipment to which the digital network terminal NT2 is connected (adapters and terminals, or a network termination NT1).

The operation of the cell insert and extract circuit 7 is described both in the receive direction and in the transmit direction, with the receive direction in an access module MA being the direction taken by information received at a port Pi and conveyed to the switching matrix MC, while the transmit direction is the opposite direction to the receive direction.

RECEIVE DIRECTION

1) Matching the switching matrix rate to the access rate (rate at the port Pi receiving information).

This function enables the switching matrix MC to operate continuously at the same rate regardless of the rate at the access (port Pi) under consideration. The circuit 7 always operates at the faster rate (either the access rate or else the switching matrix rate), and a queue at the input to the circuit 7 provides matching to the physical rate at the access. This queue operates as follows:
only active cells are inserted into the queue, with empty cells identified by the full-cell signal PC being eliminated. Because of the procedures whereby connections are established, the fraction of active cells remains compatible with the rate at the corresponding access (interface S or T);
data is written to the queue at the access rate; and
data is read from the queue at the switching matrix rate.

2) Monitoring the access lines.

This consists in taking account of the error bits detected on the access line. This accounting is made use of by the processor in charge of the access module in various different ways that do not form part of the invention.

3) Inserting and extracting signalling cells.

The cells transporting signalling received from the access lines are extracted and directed to the processor PR associated with the access module (processor for a group of access modules). These cells are identified by a bit which is set to 1 on system initialization for virtual circuit numbers that correspond to these cells, and situated in a context which is associated with each virtual circuit. Cells transporting signalling to the switching matrix are inserted in the place of empty cells in the stream of cells and the virtual circuit number used is a predetermined number.

TRANSMISSION DIRECTION

1) Matching the switching matrix rate to the access rate (rate of the port Pi transmitting information).

As in the receive direction, this function enables the switching matrix to operate continuously at the same rate regardless of the rate of the access (port Pi) under consideration. The cell insert and extract circuit 7 likewise operates at the higher data rate (either the access rate or the switching rate) and a queue provides matching to the physical rate at the access. This queue operates as follows:

only active cells are entered in the queue, with empty cells identified by the full-cell signal PC being eliminated. Because of the procedures whereby connections are established, the fraction of active cells remains compatible with the rate at the corresponding access (interface S or T);

the queue is written to at the switching matrix rate; and the queue is read from at the rate of the corresponding access, which rate is delivered by the clock module 4 of the access module.

2) Monitoring access lines.

This consists in sending redundant data mixed in with the information in order to enable the quality of the access line to be measured on reception.

3) Inserting and extracting signalling cells.

Cells transporting signalling and received from the switching matrix MC are extracted and directed to the processor PR associated with the access module (processor for the group of access modules). These cells are identified by a bit set to 1 on system initialization for virtual circuit numbers corresponding to the cells, and situated in a context associated with each virtual circuit. The cells transporting signalling to the access line are inserted in the place of empty cells in the stream of cells, and the virtual circuit number used is a predetermined number.

Figure 8:
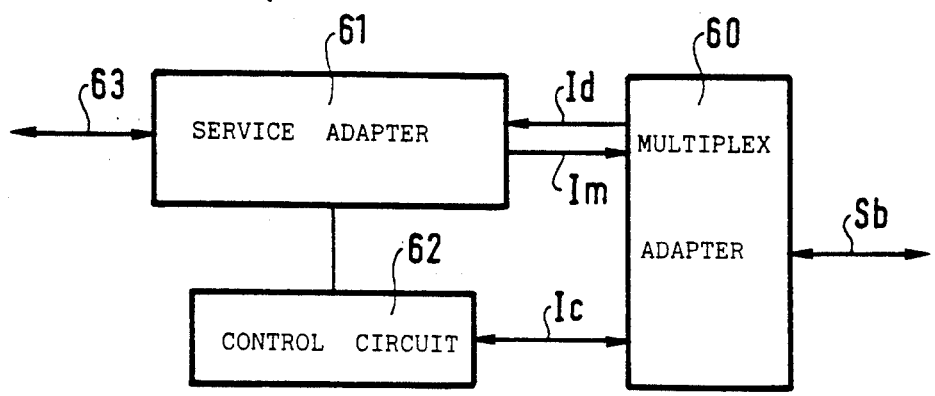
FIG. 8 shows a terminal adapter of a subscriber terminal installation.

FIG. 8 is an overall diagram of a terminal adapter B.TA or N.TA of FIG. 2, constituted by a multiplexer adapter 60, a service adapter 61, and a control circuit 62 for controlling the service adapter 61.

The multiplex adapter 60 is connected firstly to the interface Sb which is an asynchronous optical interface conveying an asynchronous multiplex, and secondly to the service adapter 61 via a down interface Id and an up interface Im. The adapter 60 is also connected to the control circuit 62 via a control interface Ic. The service adapter is also connected by an interface 63 to a broadband terminal B.TE or to a narrowband terminal N.NT2, depending on whether the terminal adapter is a broadband adapter B.TA or a narrowband adapter N.TA.

The interfaces Id and Im enable information organized in cells to be interchanged, and the interface Ic enables control or signalling messages to be interchanged.

The down interface Id conveys a down stream of data organized in cells from the multiplex adapter 60 to the service adapter 61. It is constituted by eight wires for data organized in bytes, a byte clock wire, and a cell synchronization wire.

The up interface Im conveys a stream of data organized in cells from the service adapter 61 to the multiplexer adapter 60. Like the down interface Id, it is constituted by eight wires for data organized in bytes, a byte clock wire, and a cell synchronization wire.

The control interface Ic conveys control and signalling information which is interchanged in both directions between the control circuit 62 and the multiplex adapter 60. It is constituted by a single physical medium enabling a plurality of user terminals to be connected to a bus.

Figure 9:
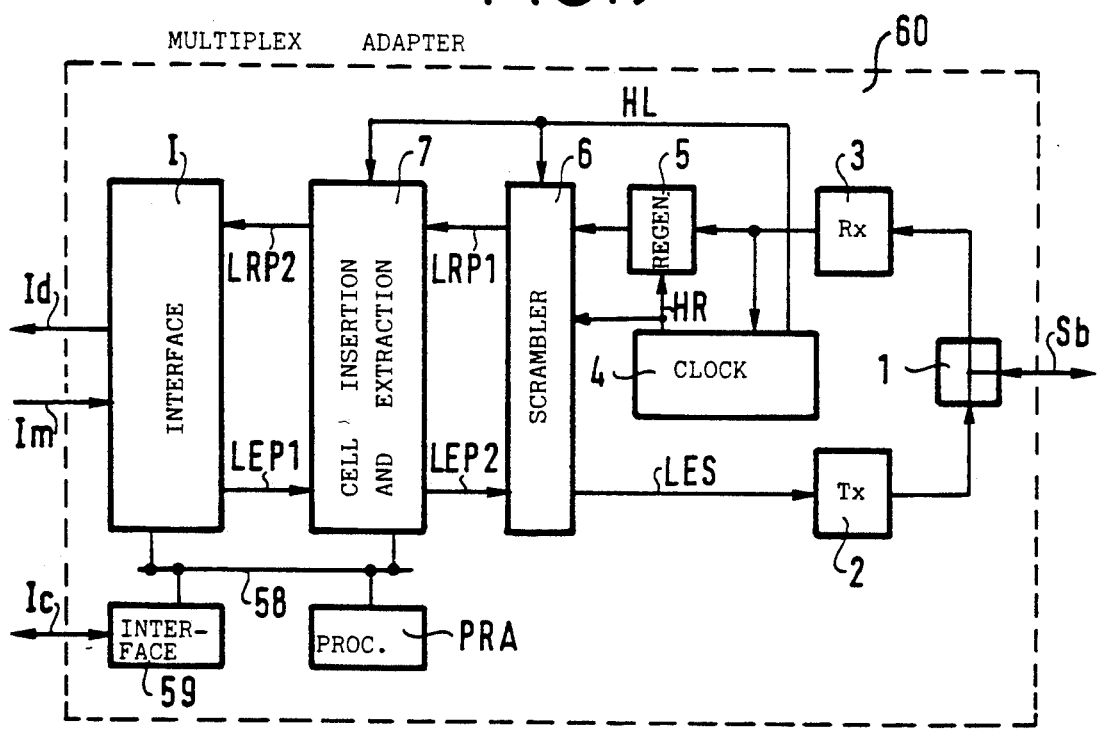
FIG. 9 shows a multiplex adapter for a terminal adapter.

FIG. 9 shows the multiplex adapter 60 of FIG. 8. This multiplex adapter constitutes the portion which is common to both broadband and narrowband terminal adapters B.TA and N.TA and it performs functions independent of the services: matching to the interfaces Sd, Id, and Im, and inserting and extracting signalling. The structure of the multiple adapter is closely related to that of the access module shown in FIG. 4, and it thus comprises a duplexer 1 connected to an interface S, an optical transmitter 2, an optical receiver 3, a clock module 4, a regenerator 5, a parallel-serial scrambler circuit 6, and a cell insert and extract circuit 7, like an access module. However, the interface circuit 8 is replaced by an interface circuit I connected firstly to the interfaces Id and Im, and secondly to the parallel receive link LRP2 and to the parallel transmit link LEP1. In addition, the multiplex adapter includes a processor PRA connected by a link 58 to the interface I and to the cell insert and extract circuit 7, and a control interface circuit 59 connected to the interface IC and to the link 58. The processor PRA and the interface circuit 59 constitute a control portion of the adapter for signalling functions.

The service adapter 61 of FIG. 8 performs the function specific to a service, i.e. there is a special adapter for each service.

In the transmit direction (up) a service adapter performs the functions of putting information into cells and of terminating signalling.

In the receive direction (down) an adapter performs the functions of recovering information that has been conveyed in cells, recovering the service rate, and terminating signalling.

There are various types of service adapter, such as the following, for example:
transmitting or receiving images;
transmitting data;
connection to a narrowband ISDN installation.

What is claimed is:

1. A subscriber digital installation for an asynchronous network in which data is organized in cells, the installation comprising:
- a first digital network terminal connected to the asynchronous network;
- a second digital network terminal connected via a two-way asynchronous optical interface to the first digital network terminal;
- first terminals connected directly to the second digital network terminal;
- second terminals connected to said second digital network terminal via terminal adapters;
- wherein the second digital network terminal comprises:
- a switching matrix;
- at least one processor; and
- a plurality of access modules having a common structure;
- each access module comprising: a first input/output connected to the switching matrix, a second input- /output connected to said processor, and a third input/output comprising a two-way asynchronous optical interface; the third input/output of one of the access modules being connected to the first network digital termination; the third input/output of some of the access modules being respectively connected to said first terminals; and the third input/output of some of the access modules being respectively connected to the terminal adapters associated with said second terminals;

each of the access modules comprising:
an optical duplexer connected to an asynchronous optical interface;
an optical transmitter and an optical receiver connected to the duplexer;
a clock module connected to the output of the optical receiver;
a regenerator connected to the output of the optical receiver and to the clock module from which it receives a recovered clock signal;
a parallel-serial scrambler circuit connected to the optical transmitter via a serial transmit link, to the optical receiver via a serial receive link, and to the clock module from which it receives a local clock signal for transmitting information and a recovered clock signal for receiving information;
a cell insert and extract circuit connected to the parallel-serial scrambler circuit via a second parallel transmit link and a first parallel receive link; and
an interface circuit connected firstly to the cell insert and extract circuit via a first parallel transmit link and a second parallel receive link, and secondly to the switching matrix via a transmit link and a receive line.

2. A subscriber terminal installation according to claim 1, wherein each of the terminal adapters is constituted by a multiplex adapter connected via an asynchronous optical interface to an access module, a service adapter connected firstly to the multiplexer adapter and secondly to a terminal, and a control circuit connected to the multiplex adapter via a control interface and to the service adapter, the multiplex adapter being the same in each terminal adapter.

3. A subscriber terminal installation according to claim 2, wherein the multiplex adapter comprises:
an optical duplexer connected to an asynchronous optical interface;
an optical transmitter and an optical receiver connected to the duplexer;
a clock module connected to the output of the optical receiver;
a regenerator connected to the output of the optical receiver and to the clock module from which it receives a recovered clock signal;
a parallel-serial scrambler circuit connected to the optical transmitter via a serial transmit link, to the optical receiver via a serial receive link, and to the clock module from which it receives a local clock signal for transmitting information and a recovered clock signal for receiving information;
a cell insert and extract circuit connected to the parallel-serial scrambler circuit via a second parallel transmit link and a first parallel receive link, and to the clock module from which it receives a local clock signal;

an interface circuit connected firstly to the cell insert and extract circuit via a first parallel transmit link and a second parallel receive link, and secondly to the service adapter;
a processor connected via a link to the interface circuit and to the cell insert and extract circuit; and
a control interface circuit connected to said link and to the control interface.

4. A subscriber terminal installation for an asynchronous network in which data is organized in cells, the installation comprising:
a first digital network terminal connected to the asynchronous network;
a second digital network terminal connected via a two-way asynchronous optical interface to the first digital network terminal;
first terminals connected directly to the second digital network terminal; and
second terminals connected to said second digital network terminal via terminal adapters;
wherein the second digital network terminal comprises:
a switching matrix;
at least one processor; and
a plurality of access modules having a common structure;
each access module comprising: a first input/output connected to the switching matrix, a second input/output connected to said processor, and a third input/output comprising a two-way asynchronous optical interface; the third input/output of one of the access modules being connected to the first network digital termination; the third input/output of some of the access modules being respectively connected to said first terminals; and the third input/output of some of the access modules being respectively connected to the terminal adapters associated with said second terminals;
each of the access modules fulfilling the following functions, under the control of said processor:
means for recovering a clock signal from data received by the third input/output;
means for generating a local clock signal defining a bit rate of data transmitted by the third input/output;
means for regenerating the levels and the time intervals of data received on the third input/output;
means for scrambling data to be transmitted by the third input/output;
means for descrambling data received by the third input/output;
means for matching the data rate of the third input/output to the data rate of the first input/output by writing and reading full cells in a queue, inserting and extracting empty cells in a flow of cells from the first to the third input/output, and in a flow of cells from the third to the first input/output;
means for enabling access modules to communicate either with one another or else with any device to which it is connected, by inserting and extracting signaling cells in said flow of cells from the first to the third input/output, and in a flow of cells from the third to the first input/output;
means for monitoring bit errors in the data received by the third input/output; and means for enabling any device connected to the third input/output to monitor bit errors in the data transmitted by the third input/output, by sending redundant data mixed with said transmitted data.

5. A subscriber terminal installation according to claim 4, wherein each of the terminal adapters is constituted by a multiplex adapter connected via an asynchronous optical interface to an access module, a service adapter connected firstly to the multiplexer adapter, and secondly to a terminal, and a control circuit connected to the multiplex adapter via a control interface and to the service adapter, the multiplex adapter being the same in each terminal adapter.

6. A subscriber terminal installation according to claim 5, wherein the multiplex adapter comprises:
   an optical duplexer connected to an asynchronous optical interface;
   an optical transmitter and an optical receiver connected to the duplexer;
   a clock module connected to the output of the optical receiver;
   a regenerator connected to the output of the optical receiver and to the clock module from which it receives a recovered clock signal;
   a parallel-serial scrambler circuit connected to the optical transmitter via a serial transmit link, to the optical receiver via a serial receive link, and to the clock module from which it receives a local clock signal for transmitting information and a recovered clock signal for receiving information;
   a cell insert and extract circuit connected to the parallel-serial scrambler circuit via a second parallel transmit link and a first parallel receive link, and to the clock module from which it receives a local clock signal;
   an interface circuit connected firstly to the cell insert and extract circuit via a first parallel transmit link and a second parallel receive link, and secondly to the service adapter;
   a processor connected via a link to the interface circuit and to the cell insert and extract circuit; and
   a control interface circuit connected to said link and to the control interface.

* * * * *